(12) United States Patent
Reinhardt et al.

(10) Patent No.: US 12,434,438 B2
(45) Date of Patent: Oct. 7, 2025

(54) METHOD FOR CLEANING A PRINT HEAD

(71) Applicant: Ivoclar Vivadent AG, Schaan (LI)

(72) Inventors: Jonas Reinhardt, Igis (CH); Christian Niedrig, Azmoos (CH); Nicola Bitar, Montlingen (CH)

(73) Assignee: Ivoclar Vivadent AG, Schaan (LI)

( * ) Notice: Subject to any disclaimer, the term of this patent is extended or adjusted under 35 U.S.C. 154(b) by 0 days.

(21) Appl. No.: 18/355,706

(22) Filed: Jul. 20, 2023

(65) Prior Publication Data

US 2024/0025120 A1 Jan. 25, 2024

(30) Foreign Application Priority Data

Jul. 21, 2022 (EP) .................................. 22186215

(51) Int. Cl.
| | | |
|---|---|---|
| B08B 3/10 | (2006.01) | |
| B08B 3/12 | (2006.01) | |
| B29C 64/112 | (2017.01) | |
| B29C 64/209 | (2017.01) | |
| B29C 64/35 | (2017.01) | |
| B33Y 30/00 | (2015.01) | |
| B33Y 40/00 | (2020.01) | |

(52) U.S. Cl.
CPC ................ *B29C 64/35* (2017.08); *B08B 3/10* (2013.01); *B08B 3/12* (2013.01); *B29C 64/112* (2017.08); *B29C 64/209* (2017.08); *B33Y 30/00* (2014.12); *B33Y 40/00* (2014.12)

(58) Field of Classification Search
CPC .. B08B 3/12; B08B 7/02; B08B 7/026; B08B 7/028; B29C 64/35; B41J 2/16517
See application file for complete search history.

(56) References Cited

U.S. PATENT DOCUMENTS

| | | | |
|---|---|---|---|
| 2001/0012029 A1* | 8/2001 | Momose | B41J 2/16508 347/30 |
| 2011/0292136 A1* | 12/2011 | Kurebayashi | B41J 2/16526 347/85 |
| 2016/0059495 A1 | 3/2016 | Laubersheimer et al. | |
| 2022/0152666 A1* | 5/2022 | Coughlin | B08B 13/00 |
| 2023/0182473 A1* | 6/2023 | Ishida | B41J 2/16505 347/28 |

FOREIGN PATENT DOCUMENTS

| | | |
|---|---|---|
| DE | 102019007952 A1 | 5/2021 |
| EP | 2233449 A1 * | 9/2010 |
| JP | H 7-304191 A | 11/1995 |
| JP | 2005119268 A | 5/2005 |
| JP | 2011152486 A | 8/2011 |
| JP | 201220235 A | 2/2012 |
| JP | 2012250401 A * | 12/2012 |

\* cited by examiner

*Primary Examiner* — Kaj K Olsen
*Assistant Examiner* — Richard Z. Zhang
(74) *Attorney, Agent, or Firm* — Ann M. Knab; Thad McMurray

(57) ABSTRACT

A method for removing deposits in a print head of a 3D printer, including the steps of supplying (S101) a liquid having a granular solid to the print head; and setting into vibration (S102) the liquid in the print head.

9 Claims, 6 Drawing Sheets

METHOD FOR CLEANING A PRINT HEAD

CROSS-REFERENCE TO RELATED APPLICATIONS

This application claims priority to European Patent Application No. 22186215.4 filed on Jul. 21, 2022, the disclosure of which is incorporated herein by reference in its entirety.

TECHNICAL FIELD

The present invention relates to a method for removing deposits in a print head and to a 3D printer comprising a print head.

BACKGROUND

When printing inks with a nozzle, deposits and clogging in the print head occur again and again. These are currently removed with special cleaning agents, by flushing with ink or a cleaning agent, or by strongly spraying ink out of the nozzle. When cleaning is done with a cleaning agent, the entire fluid system is filled with the cleaning agent. This is done by disconnecting the print head from the fluid system to introduce the cleaning agent. However, cleaning agents cannot remove severe blockages. US 20160059495 is directed to a 3D inkjet printing process and is hereby incorporated by reference in its entirety.

SUMMARY

It is the technical task of the present invention to efficiently remove deposits in a print head.

This technical task is solved by the subject matter according to the independent claims. Technically advantageous embodiments are the subject matter of the dependent claims, the description and the drawings.

According to a first aspect, the technical task is solved by a method for removing deposits in a print head of a 3D printer, comprising the steps of supplying a liquid comprising a granular solid to the print head; and setting into vibration the liquid in the print head. The granular solids that are set into vibration create a vibratory grinding effect (trowalizing effect) that can be used to remove deposits within the print head. This effect can be used to loosen or dissolve any deposits or blockages in the fluid system of the print head. Since the solid bodies create a scrubbing effect on the side walls with their movement, deposits in the fluid channels and at the nozzles can be dissolved and removed. Dirt and deposits that were previously impossible to remove can be removed effectively and inexpensively. As a result, high quality printing can be achieved and failures of individual nozzles can be prevented.

In a technically advantageous embodiment of the method, the granular solid comprises zirconium oxide particles and/or silica particles. The liquid may have a solids content of more than 20%. This provides, for example, the technical advantage that the deposits can be efficiently removed.

In a further technically advantageous embodiment of the method, the particles in the granular solid have a maximum size of half the diameter of an outlet nozzle in the print head. This achieves, for example, the technical advantage that a good cleaning effect is achieved.

In a further technically advantageous embodiment of the method, the granular solid is arranged in a printing liquid. This achieves, for example, the technical advantage that a separate supply of the granular solid or the supply of a cleaning liquid can be dispensed with. In this case, the printing liquid is also the cleaning agent.

In a further technically advantageous embodiment of the method, an outlet nozzle of the print head is closed while the liquid in the print head is set into vibration. This achieves the technical advantage, for example, that the cleaning effect is improved and leakage of the liquid is prevented.

In a further technically advantageous embodiment of the method, the outlet nozzle is closed by moving the print head in front of a closing device. This achieves, for example, the technical advantage that the print head can be closed in a simple manner.

In a further technically advantageous embodiment of the method, the fluid is set into vibration by means of piezo elements in the print head, by coupling ultrasonic waves and/or by employing a magnetic piston pump. The coupling of ultrasonic waves can be achieved by coupling an external ultrasonic generating device into the fluid system. This achieves, for example, the technical advantage that the liquid can be set into vibration by simple means.

In a further technically advantageous embodiment of the method, the liquid is set into vibration with its natural frequency in the print head. The natural frequency of the liquid arises in the available volume of the print head. This achieves, for example, the technical advantage that the liquid can be set into vibration with a high amplitude and a low expenditure of energy.

In a further technically advantageous embodiment of the method, the liquid is set into vibration with a frequency between 100 Hz and 150 kHz. This achieves the technical advantage, for example, that a particularly good cleaning effect can be achieved in the frequency range mentioned.

In a further technically advantageous embodiment of the method, the liquid is set into vibration over a predetermined period of time. This achieves, for example, the technical advantage that continuous cleaning takes place. The cleaning can be carried out in stand-by mode, for example. This can ensure that the print head is provided in a cleaned condition for the next use. The time between two printing orders can then be used for the maintenance of the print head.

According to a second aspect, the technical task is solved by a 3D printer with a print head comprising a feeding device for supplying a liquid including a granular solid to the print head; and a vibration generating means for setting into vibration the liquid in the print head. The 3D printer achieves the same technical advantages as the method according to the first aspect.

In a technically advantageous embodiment of the 3D printer, the 3D printer comprises a closing device for closing an outlet nozzle while the liquid in the print head is being set into vibration. This also achieves, for example, the technical advantage of improving the cleaning effect and preventing the liquid from leaking. It is thus also possible to operate the vibratory grinding process for any desired duration.

In a further technically advantageous embodiment of the 3D printer, the closing device is formed by a closing plate. This achieves the technical advantage, for example, that the print head can be closed in a simple manner and with a high degree of tightness.

In a further technically advantageous embodiment of the 3D printer, the 3D printer comprises a piezo element in the print head, a coupling element for coupling ultrasonic waves, and/or a magnetic piston pump for setting into vibration the liquid in the print head. This achieves, for example, the technical advantage that the liquid can be set into vibration by simple means.

In a further technically advantageous embodiment of the 3D printer, the 3D printer comprises a time switch device for activating the vibration generating device at a predetermined time and/or for a predetermined duration. This achieves, for example, the technical advantage that a time-controlled cleaning of the print head can be performed.

BRIEF DESCRIPTION OF THE DRAWINGS

Examples of embodiments of the invention are illustrated in the drawings and are described in more detail below, in which.

DETAILED DESCRIPTION

Figure 1:
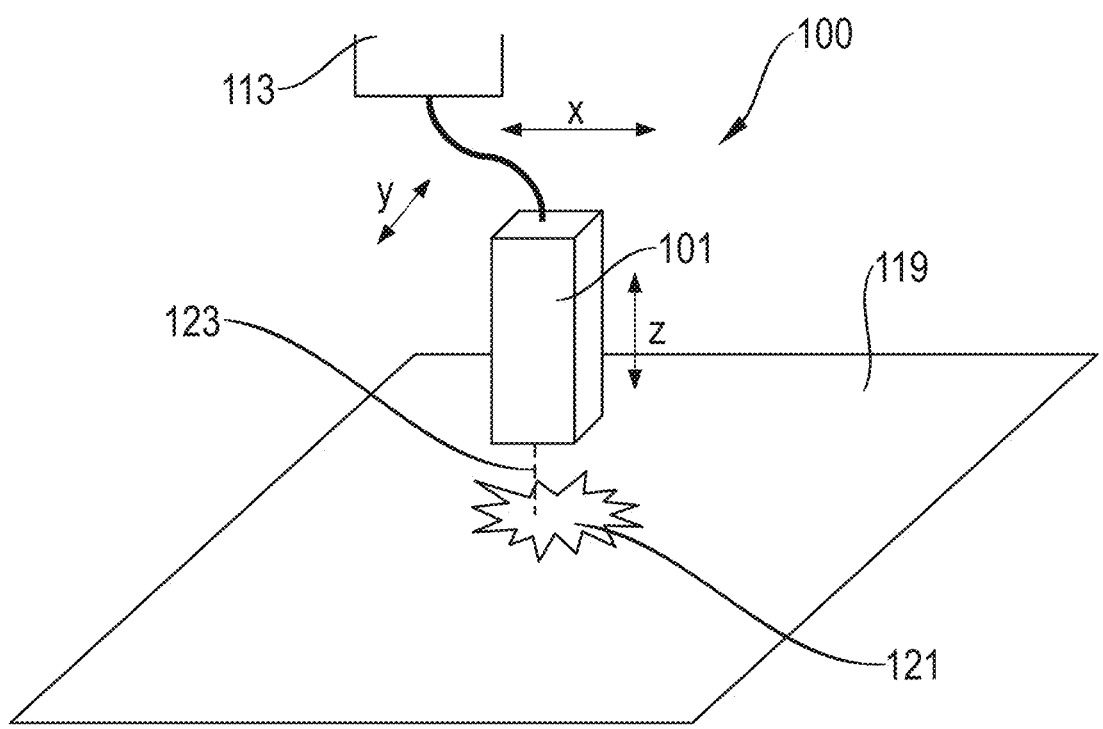
FIG. 1 shows a schematic view of a 3D printer with a print head.

FIG. 1 shows a schematic view of a 3D printer 100 with a print head 101. The 3D printer 100 performs a free-jet material deposition in an additive manufacturing process. In this process, raw material is selectively deposited in the form of small droplets of a printing liquid. In poly-jet or multi-jet modeling, a model is manufactured by means of a print head 101 with multiple linearly arranged nozzles.

For example, the 3D printer 100 uses the printing liquid in order to build up a dental restoration 121 on an assembly platform 119 layer by layer. For this purpose, the material from the printing liquid is applied selectively by means of a print jet 123 from an outlet nozzle. The print head 101 can be moved in the X-direction, in the Y-direction and in the Z-direction so that the print jet 123 can reach any point of the assembly platform 119. The printing liquid is supplied to the print head 101 by means of a feeding device 113.

However, the problem arises here that deposits in the form of ink residues, foreign substances or sediments can form in the print head 101. These adhere to the inner sides of the fluid system inside the print head 101, so that over time they cause clogging and impair the function of the outlet nozzles and the print head 101.

Figure 2:
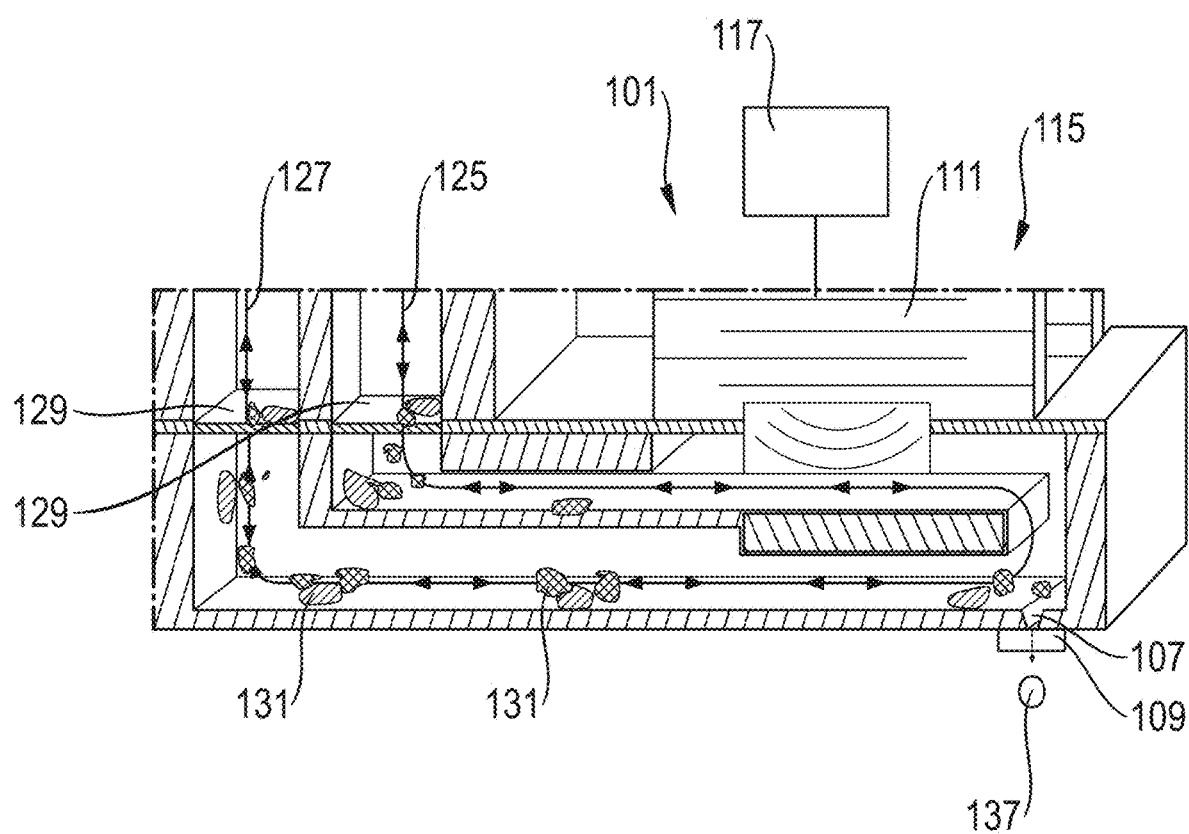
FIG. 2 shows a schematic view of a print head.

FIG. 2 shows a schematic view of a print head 101. The print head 101 comprises at least one outlet nozzle 107, from which the print jet 123 is emitted. This is done via printing changes in the printing liquid generated by means of one or more piezo elements 111 of the print head 101.

The print head 101 is a circulation print head in which the printing liquid is supplied via a feed channel 125. This is fed inside the print head 101 past the outlet nozzle 107 and is partially discharged in the form of droplets 137. The portion of the printing liquid that is not discharged is passed on inside the print head 101 and is discharged through a return channel 127. Inside the feed channel 125 and the return channel 127 are the filters 129 that prevent coarse impurities of the printing liquid from flowing further. In general, the print head 101 of the 3D printer 100 may also have a different design.

Over time, deposits 131 in the form of dirt or solid particles may form on the sidewalls of the feed channel 125 and return channel 127 or the outlet nozzle 107. In order to remove these deposits 131 from the sidewalls again, the printing liquid comprising a granular solid is excited to vibrate mechanically within the print head 101. The granular solid 105 comprises, for example, small zirconia dioxide particles or silica particles. These have, for example, a maximum size of half the diameter of an outlet nozzle 107. In general, the particles of the granular solid 105 may have a size of 1 nm to 100 μm.

In this case, the outlet nozzle 107 can also be cleaned by means of the granular solid 105. The cleaning effect is achieved externally at the nozzle plate, internally at the outlet nozzles 107, the filters 129 and the feed channel 125 or return channel 127. In general, the entire fluid system of the print head 101 may be cleaned by means of the liquid.

A vibratory grinding effect (trowalizing effect) is achieved by the vibrating solid particles through the abrasive granular solid 105, with the help of the deposits 131 inside the print head 101 can be removed again. The deposits 131 are removed by vibratory grinding or flow grinding. With this effect, any deposits 131 or blockages in the fluid system of the print head 101 can be dissolved. Since the solid particles create a scrubbing effect on the sidewalls with their movement, deposits in the piping system can be dissolved and removed.

The movement or vibration of the granular solid 105 may be generated in a variety of ways, for example, by exciting the piezo elements 111 in the print head 101, by coupling ultrasonic waves, or by a magnetic piston pump. To this end, the 3D printer 100 may include a time switch device 117 for activating the vibration generating device 115 at a predetermined time and/or for a predetermined duration. For example, the activation of the vibration generating device 115 may be provided continuously for a period of time longer than 5 min.

By closing the outlet nozzle 107 with a closing device 109 in the form of for example, but not limited to, a closing plate, an adhesive tape, or a rubber element, the liquid can be excited to vibrate to a maximum within the print head 101. For example, the print head 101 can dock on a rubber plate so that all outlet nozzles 107 are closed at the front side thereof and no printing liquid can escape. Then, the piezo elements 111 of the print head 101 are used as a vibration generating device 115 and are continuously excited at the maximum power for a longer period of time. In this process, the scrubbing effect of the granular solid 105 introduced in the liquid 103 is produced.

For example, the vibrations are excited in intervals with a duration of 5-10 min. Subsequently, a break of 30-60 min may be taken. The duration for a cleaning operation generally depends on the intensity (amplitude) of the vibrational movement. The higher is the amplitude of the vibrational movement, the shorter is the time required for a cleaning operation.

It is also possible to mix the granular solid 105 with a printing liquid so that the deposits 131 are prevented. The printing operation with such a printing liquid creates a scrubbing effect, so that no deposits 131 can form.

For example, with this method, when zirconia slurry is used, the existing zirconium dioxide in the printing liquid can be used to clean the print head 101 by setting it in motion for a longer period of time so that a scrubbing effect is produced. This achieves the technical advantage that no special cleaning liquid is required, and cleaning of the fluid system of the print head 101 is easy to perform. In this case, the printing liquid does not have to be replaced with a special cleaning liquid at great expense.

Figure 3:
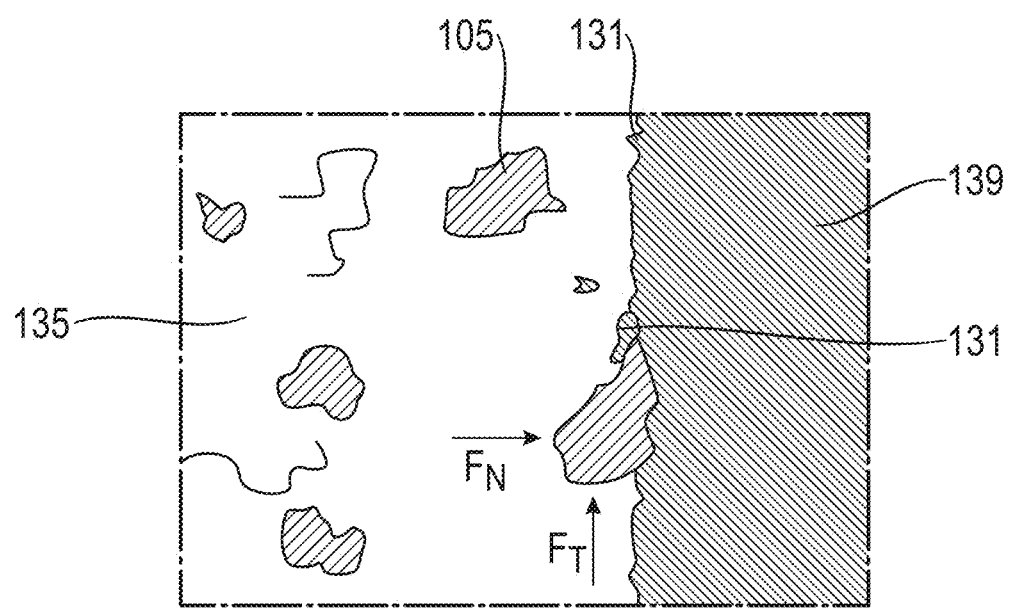
FIG. 3 shows a schematic representation of a vibratory grinding effect.

FIG. 3 shows a schematic view of the vibratory grinding effect in a sludge 135, also called ink or slurry. A normal force $F_N$ and a tangential force $F_T$ act on the granular solid 105 while it is subjected to vibrations. The normal force $F_N$ presses the granular solid 105 against the side wall 139. There, it removes the deposits 131 due to the tangential force $F_T$.

When the vibration of the liquid 103 is excited with the resonant frequency of the system, the largest amplitude of the vibration of the granular solid 105 is achieved. In this case, the liquid 103 can be set into vibration with a high amplitude and a low energy expenditure in the print head 101. As a result, the deposits 131 can be effectively removed. In general, the cleaning effect depends on the frequency and intensity of the movement.

Figure 4:
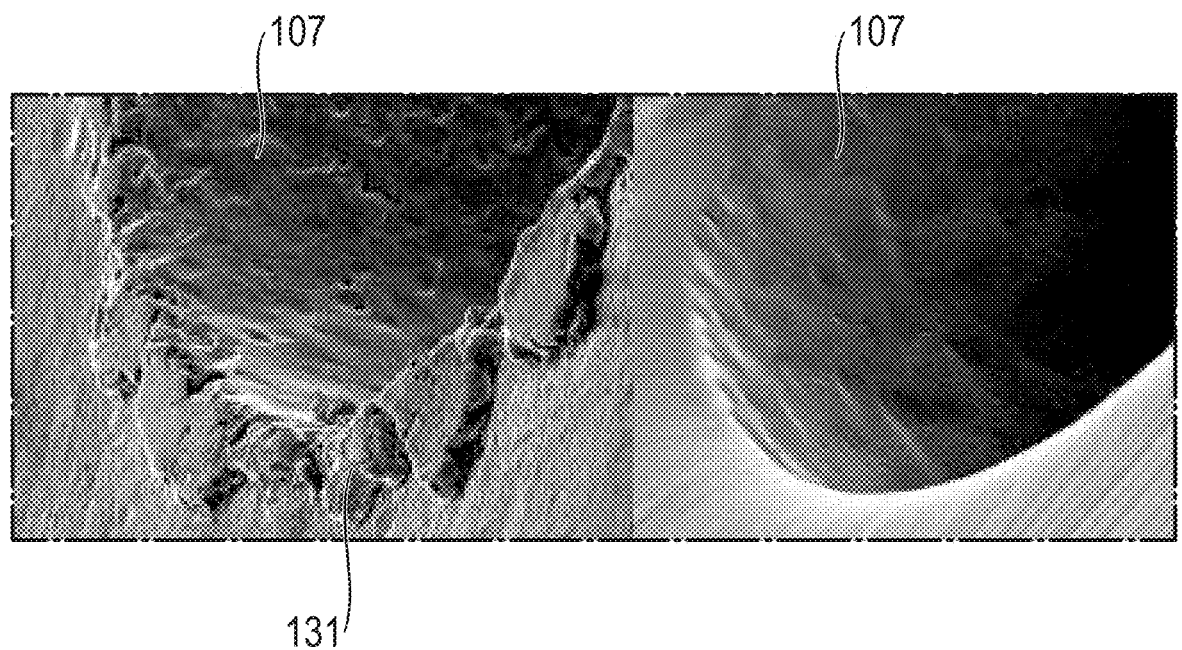
FIG. 4 shows a view of an outlet nozzle before and after cleaning.

FIG. 4 shows a view of an outlet nozzle 107 before and after a cleaning operation. On the left side, the outlet nozzle 107 is shown with deposits 131 before a cleaning operation. On the right side the outlet nozzle 107 is shown after a cleaning operation.

Figure 5:
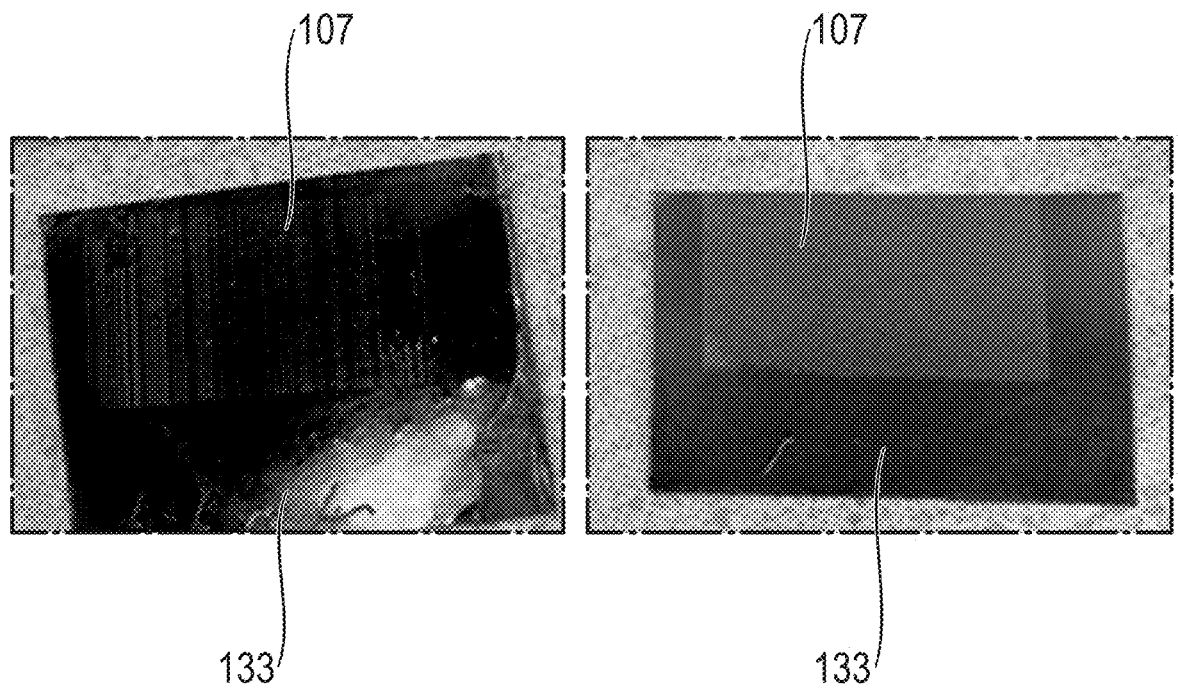
FIG. 5 shows a nozzle plate of a print head with numerous outlet nozzles.

FIG. 5 shows a nozzle plate 133 of a print head 101 with numerous outlet nozzles 107. On the left side, it is shown the case before a cleaning operation that about 50% of the outlet nozzles 107 fail. On the right side, it is shown that after cleaning, all of the outlet nozzles 107 are functioning.

Figure 6:
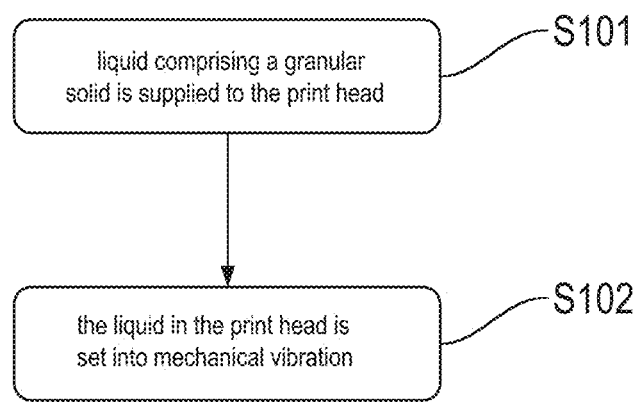
FIG. 6 shows a block diagram of a method for removing deposits in a print head.

FIG. 6 shows a block diagram of a method for removing deposits 131 in a print head 101. In step S101, the liquid 103 comprising a granular solid 105 is supplied to the print head 101. In step S102, the liquid 103 in the print head 101 is set into mechanical vibration. With this method, the function of all outlet nozzles 107 of the print head 101 can be maintained in a simple manner. This allows printing with a quality similar to that of a new print head. In addition, usual aging of a print head is prevented.

The process enables flawless printing and ensures that all outlet nozzles 107 are functioning. Losses due to aging of the print head can be prevented. The cleaning operation of the print head 101 is simple and saves time because the existing printing liquid can be used for cleaning. The print head does not need to be removed for cleaning. The inside of the liquid system in the print head and the side walls of the piping system are additionally smoothed and polished by means of the vibratory grinding effect, as it is also the case with trowalizing. Previously accepted printing quality losses due to aging can be prevented with this method.

The method can remove stubborn incrustations without a chemical process and can increase the reliability of the print head, so that a proper functioning of all outlet nozzles is ensured. The method can also remove deposits from the entire flow system or circulation system.

All features explained and shown in connection with individual embodiments of the invention may be provided in different combinations in the subject matter of the invention to simultaneously realize the beneficial effects thereof.

All method steps can be implemented by devices which are suitable for executing the respective method step. All functions that are executed by the features of the subject matter of the invention can be a method step of a method.

The scope of protection of the present invention is given by the claims and is not limited by the features explained in the description or shown in the figures.

LIST OF REFERENCE SIGNS 100 3D printer
101 print head
103 liquid
105 solid
107 outlet nozzle
109 closing device
111 piezo element
113 feeding device or feeder
115 vibration generating device or vibration generator
117 time switch device or time switch
119 assembly platform
121 dental restoration
123 printing jet
125 feed channel
127 return channel
129 filter
131 deposits
133 nozzle plate
135 slurry
137 droplets
139 sidewall

The invention claimed is:

1. A method for removing deposits in a print head of a 3D printer, comprising the steps of:
supplying a liquid comprising a granular solid to the print head; and
setting into vibration the liquid in the print head;
wherein an outlet nozzle of the print head is closed by a closing device while the liquid in the print head is set into vibration so that no liquid can escape through an opening of the nozzle;
wherein the print head comprises a feeding channel and a return channel;
wherein deposits are removed from both the feeding channel and the return channel.

2. The method according to claim 1,
wherein the granular solid comprises zirconium oxide particles and/or silica particles.

3. The method according to claim 1,
wherein the granular solid comprises particles that have a maximum size of half a diameter of the outlet nozzle in the print head.

4. The method according to claim 1,
wherein the granular solid is arranged in a printing liquid.

5. The method according to claim 1,
wherein the outlet nozzle is closed by moving the print head in front of the closing device.

6. The method according to claim 1,
wherein the liquid is set into vibration by a piezo element in the print head, by coupling ultrasonic waves, and/or by a magnetic piston pump.

7. The method according to claim 1,
wherein the liquid is set into vibration with its natural frequency in the print head.

8. The method according to claim 1,
wherein the liquid is set into vibration with a frequency between 100 Hz and 150 kHz.

9. The method according to claim 1,
wherein the liquid is set into vibration for a predetermined period of time.

* * * * *